May 5, 1970

G. H. LISTER 3,510,677

ELECTRONIC DETECTION SYSTEM

Filed Aug. 12, 1966

INVENTOR.
GEORGE H. LISTER
BY
Baldwin, Doran & Egan
ATTORNEYS

INVENTOR.
GEORGE H. LISTER

May 5, 1970   G. H. LISTER   3,510,677
ELECTRONIC DETECTION SYSTEM
Filed Aug. 12, 1966   4 Sheets-Sheet 4

INVENTOR.
GEORGE H. LISTER
BY
Baldwin, Dunn & Egan
ATTORNEYS

United States Patent Office 3,510,677
Patented May 5, 1970

3,510,677
ELECTRONIC DETECTION SYSTEM
George H. Lister, Cleveland, Ohio, assignor to The Euclid Electric & Manufacturing Co., Madison, Ohio, a corporation of Ohio
Filed Aug. 12, 1966, Ser. No. 572,007
Int. Cl. G08b 13/26
U.S. Cl. 307—116     2 Claims

ABSTRACT OF THE DISCLOSURE

An electronic detection system for detecting the presence or proximity of an object thereto and which has a pair of signal generators operable to generate a signal of a different frequency and which signals are mixed to produce a beat frequency signal. Tuned amplifiers in each generator are operated in a saturated condition whereby the output signal therefrom and the resultant beat frequency signal are of a constant amplitude. Filter means and rectifier means receive the beat frequency signal and provide a control signal whose value is solely responsive to frequency changes.

---

Figure 1:
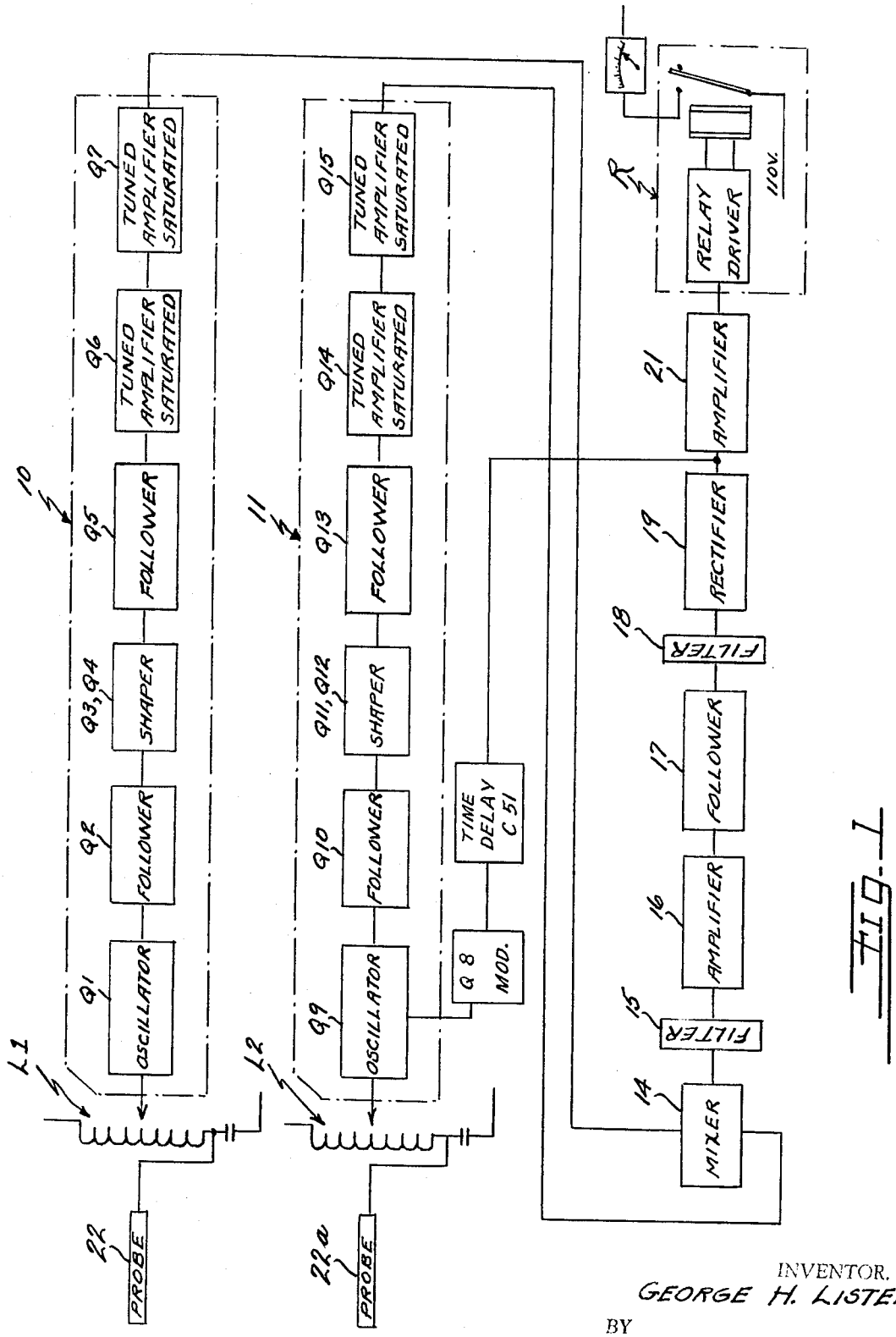

This invention relates generally to a detection system and more particularly to an electronic detection system especially designed to sense the presence or proximity of objects and/or materials thereto as said object and/or material approaches sensing means for the system which then creates electrical changes or electrical unbalance conditions in the system; the said changes then being utilized to produce a corresponding responsive signal which is then used to provide an indication of said material or object.

Briefly, the detection system of the present invention incorporates two separate signal generators, each of which generates an output signal of a predetermined different frequency. These two signals are then mixed together to produce a "beat frequency signal" which is then used to define a normal or quiescent signal condition.

Each of the signal generators includes circuit components which determines the frequency characteristics of its output signal. The circuit components are susceptible to the presence of object(s) and/or material to correspondingly change the frequency of the output signal which when mixed with the output of the other signal generator produces a "beat frequency signal" of a different frequency than that defining the normal or quiescent signal condition.

This deviation in frequency is directly related to the proximity of the object(s) or material to the instant detection system.

This relationship can be used for many purposes as for example to sense and measure the proximity of object(s) or material to a certain location; to determine material quantities such as wheat or flour in a storage bin; to provide an accurate count of objects passing a particular station; to maintain the location of products in manufacturing processes such as metal or glass in rolling mills and the like and many other purposes.

Heretofore, a primary disadvantage of detection systems of this general type, one such system being disclosed in U.S. Pat. 2,421,771 which issued on June 10, 1957 to Glenn Browning, has been that said systems are amplitude sensitive. That is to say the amplitude of the detection signal generated by the system is sensitive to changes in many parameters, such as line voltage, component aging, temperature changes of components, atmospheric conditions such as lightning discharges, rain and other like conditions. Any one or several of said conditions can cause an amplitude sensitive system to generate a signal which falsely indicates the proximity of an object(s) or material when such items are not, in fact, in the presence of said system.

Therefore, a primary object of the present invention is to provide a detection system which is capable of accurately sensing and detecting the proximity of an object(s) or material thereto.

Another object is to provide a detection system which is operable to detect the proximity of an object(s) or material thereto and wherein the system includes two signal generators each of which generates a signal of predetermined frequency characteristics, mixing means for mixing said two signals together to provide a "beat frequency signal" which has a predetermined frequency defining a system quiescent condition, and means whereby the proximity of an object(s) or material to the system correspondingly changes the frequency of operation of either signal generator which is effective to produce a "beat frequency signal" of a different frequency, which different frequency is related to the proximity of the object(s) or material thereto.

A still further object of the present invention is to provide a detection system as is hereinabove defined and wherein the system is operable to sense changes in signal frequencies caused by the proximity of objects or material thereto while being insensitive to changes in signal amplitudes caused by circuit and/or atmospheric parameters and the like.

Additional objects and advantages of the detection system of the present invention will be apparent to one skilled in the art to which it pertains and upon reference to the following disclosure of a preferred embodiment, and which is illustrated in the accompanying drawings wherein:

FIG. 1 is a simplified block diagram of the detection system of the present invention; and FIGS. 2–5 is a complete schematic wiring diagram showing the electrical circuitry of the system of FIG. 1.

Referring to FIG. 1 of the drawings the detector system of the present invention comprises basically two signal generators 10 and 11, each of which generates a signal of precise different frequency.

The output signal of each generator is applied to a mixer circuit 14 wherein said signals are mixed or heterodyned to provide a "beat frequency signal."

This "beat frequency signal" is then passed through a wide band intermediate frequency filter 15 wherein the sum frequency component of the mixer output are filtered out leaving only the difference frequency component which is then amplified by amplifier 16.

This amplified difference frequency component is then coupled by follower 17 to high pass A.F. filter 18 having a sharp response on its low frequency edge.

The output signal from A.F. filter 18 is then rectified at 19 and amplified at 21 sufficiently to provide a control voltage or signal to perform a control function such as to operate relay R and/or provide a logic signal to a computer.

When the detection system is installed, it is provided with one or two sensing devices 22, 22a, each of which is connected to the input of one of the signal generators 10, 11.

In the present embodiments, the sensing devices 22, 22a take the form of a capacitance-type probe the capacitance of which changes in response to an object(s) or material being moved into proximity thereto. Each sensing device or probe 22, 22a is disposed to sense or detect the desired occurrence, as for example, the movement of objects therepast to provide a count of the same or in determining and maintaining placement of an object(s) or material as it is moving through a manufacturing process.

The system is first activated with the sensing probes at rest to provide a "beat frequency signal" representing the system quiescent or an at rest condition.

Thereafter, with the probes sensing the occurrence to be detected the capacitance characteristics of said sensing probe(s) are changed to modify the electrical characteristics of its connected signal generator 10, 11 to result in the generation of a corresponding "active beat frequency signal" of different frequency, the difference in frequency between the active beat frequency signal and the quiescent beat frequency signal being thus representative of the particular occurrence taking place.

An inductor such as L1, L2 may also be used as the sensing device inasmuch as any change in L or C in the series resonant circuit of the generator will effect a corresponding change in frequency of operation of said generator.

Figure 2:
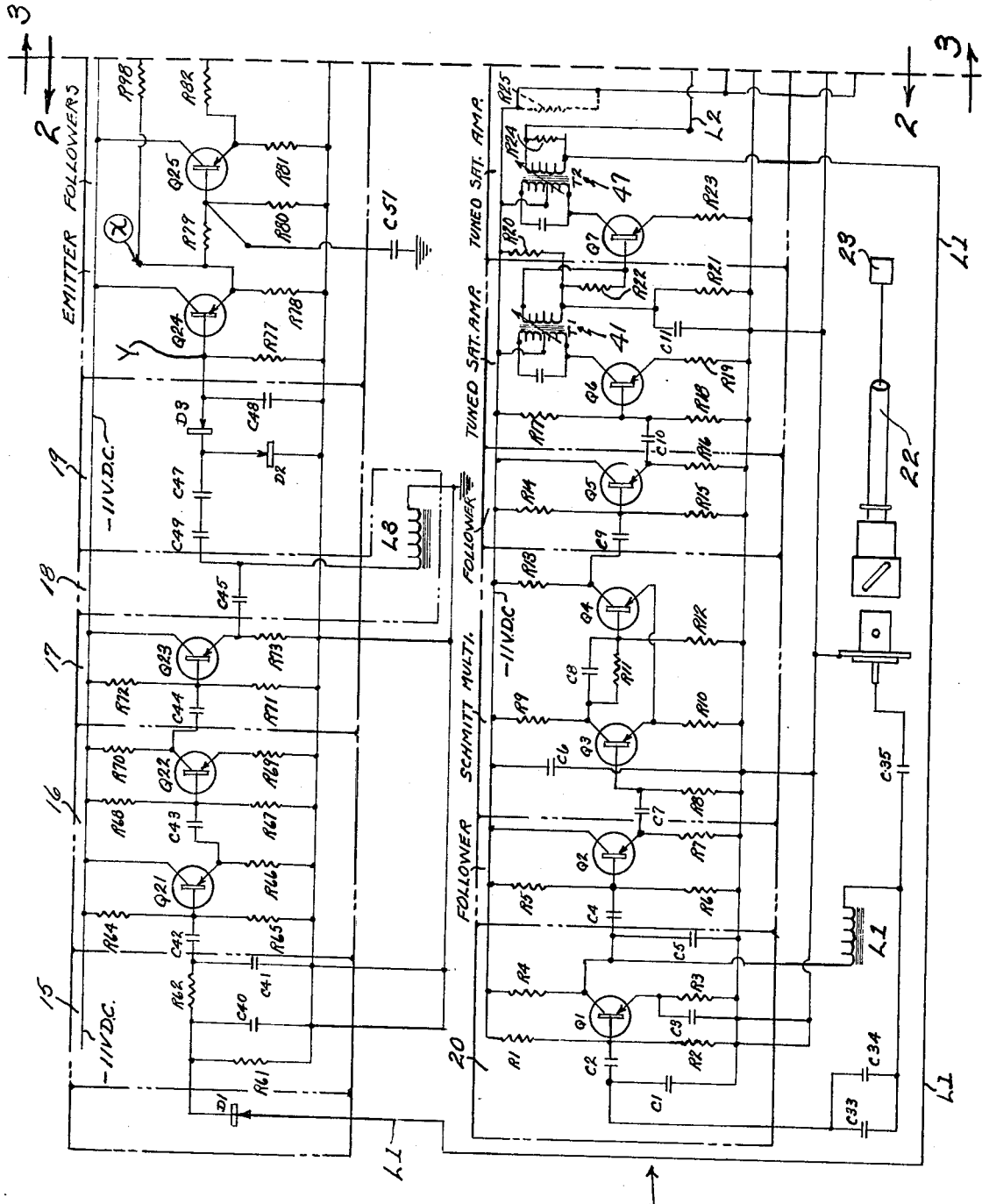
Figure 3:
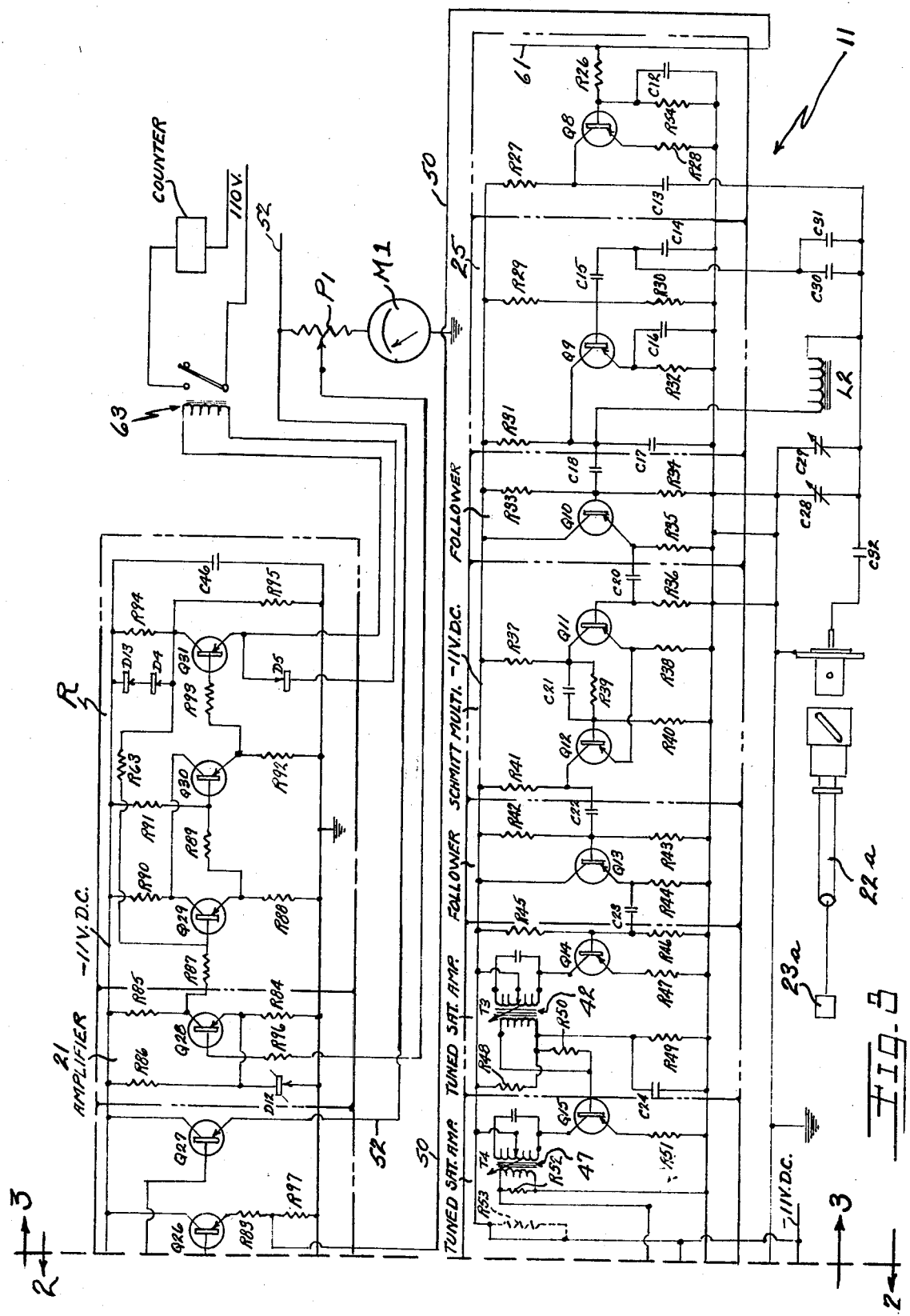
Figure 4:
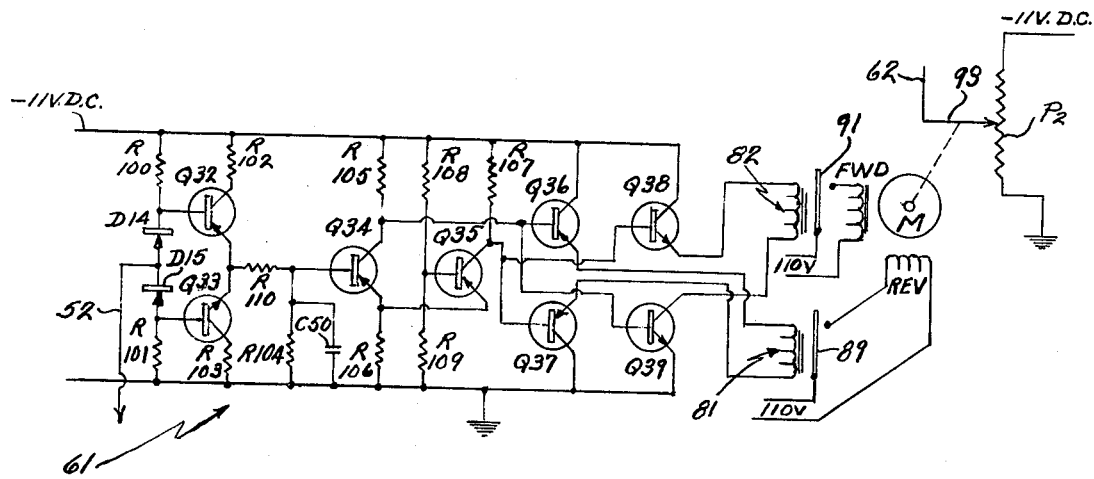

With reference now directed to the block diagram of FIG. 1 and the corresponding circuit structure therefor as shown in FIGS. 2–4, the signal generators 10, 11 of the instant detection system are seen to be identical to each other, with the exception that one of the generators 11 has a frequency compensator circuit, the purpose of which will be hereinafter explained.

As seen particularly in FIG. 2, the generator 10 includes a highly stable transistor oscillator 20 comprising a single transistor Q1 having a sensor probe 22 connected to its frequency determining network comprising inductor L1, capacitors C33, C34, C35, the cable and the probe capacitance. The probe 22 may comprise a single metal plate 23 as shown or a plurality of metal plates connected to the end of a conventional coaxial cable which is coupled by said capacitor C35 to the input of the oscillator 20.

In the event the instant detection system is to monitor an occurrence at two stations such as, for example, the opposed edges of a steel slab moving along a conveyance path, a second sensor probe 22a, identical to probe 22, may be connected to the input of the signal generator 11, FIG. 3.

The generator 11 as aforesaid is identical to generator 10 and comprises transistor Q9 which has inductor L2, capacitors C30 and C31 connected between its base input and collector output to form a second oscillator 25. Variable capacitors C28 and C29 provide coarse and fine frequency adjustment respectively for said oscillator.

The oscillators 20 and 25 are made to produce essentially pure sine waves of relatively constant amplitude such that the frequency of each is independent of supply voltage and/or other changes in component parameters and associated equipment. The circuit should preferably be such that the inductor and capacitor elements comprising the feedback path in the oscillator circuitry be the only circuit elements that affect the frequency of the generated signal.

To accomplish this, in the circuit of oscillator 20 a large capacitor C5 is effectively connected across the collector-emitter circuit of transistor Q1 and is thereby in parallel with the relatively small internal collector to emitter capacity of said transistor.

Likewise, a large capacitor C1 is effectively connected across the emitter-base circuit of the transistor Q1 in parallel with the relatively small internal emitter to base capacity of said transistor.

In like manner, in the circuit of generator 11 a large capacitor C17 is connected across the collector-emitter circuit of transistor Q9 and hence across the internal collector to emitter capacity of said transistor. Further, a large capacitor C14 is connected across the base-emitter circuit of transistor Q9 and thereby in parallel with the internal base to emitter capacity.

These large capacitors C1, C5 in oscillator 20 and capacitors C17, C14 in oscillator 25 in shunt respectively with the internal interelectrode capacity of the associated oscillator washes out or materially eliminates any tendency for the frequency of the oscillators 20 and 25 to vary as a result of these interelectric parameters.

In oscillator 20, by utilizing a series resonant circuit consisting of inductance L1 of relatively high Q and capacitors C33, C34 between the base and collector of transistor Q1 said circuit oscillates at the resonant frequency of this series resonant circuit. Actually the input capacity of the sensor probe 22 and the coaxial cable capacity are in series with capacitances C1 and C35 and appear across capacitances C33 and C34 as part of the series resonant circuit. The use of a high Q inductance L1 provides sufficient coupling as to permit the oscillator to oscillate even though the entire circuit is padded down with capacitances C1 and C5.

In like manner, in oscillator 25 the series resonant circuit consisting of inductance L2 of relatively high Q and capacitors C30, C31 between the base and collector of transistor Q9, said circuit oscillates at the resonant frequency of this series resonant circuit.

The circuitry of the instant detection system as herein disclosed incorporates a closely regulated power supply of conventional circuit design (not shown) which provides direct current voltages of ±11 volt magnitudes for the system.

It has been found that with the system circuitry as shown and with the component values as hereinafter listed and identified, and the closely regulated power source of ±11 volts direct current, the operation of the oscillators 20 and 25 are quite independent of any tendency of the supply voltage to vary. In fact, it has been found that a change of supply voltage from two to twenty volts causes only a two to three cycle change in the signal output having a frequency of 65,000 cycles per second.

The circuit components of said oscillators 20 and 25, as hereinafter identified, are selected so that oscillator 20 has a quiescent operating frequency of 65,000 cycles per second and oscillator 25 a quiescent operating frequency of 75,866 cycles per second. However, as will be hereinafter apparent, any preselected pair of frequencies may be used for the oscillators 20 and 25.

When using two sensor probes 22 and 22a, one for each signal generator 10, 11 respectively, the capacitors C30 and C31 of oscillator 25 are essentially equal to capacitors C33 and C34 less about one-half the value of the adjustable capacitors C28 and C29.

When it is desired to use merely one probe, probe 22 is used and probe 22a is disconnected from the oscillator 25. In this instance, the circuit of oscillator 25 is such that the combination of capacitors C30 and C31 equal the capacitance of the probe 22 and its connecting cable. The oscillator frequency of oscillator 25 then remains at its quiescent frequency.

The signal output of oscillator 20 is lightly coupled by transistor follower Q2 to a conventional Schmitt multivibrator consisting of transistors Q3, Q4. In like manner, the signal output of oscillator 25 is coupled by follower Q10 to Schmitt multivibrator Q11, Q12. Multivibrator Q3, Q4 receives the sine wave output from oscillator 20 and converts it into a signal of approximate square waveform such as indicated by the waveform at point A which waveform is substantially rich in harmonic content and of constant amplitude which is determined by power supply voltage. In like manner, the multivibrator Q11, Q12 converts the sine wave output signal of oscillator 25 into a square wave signal which is also rich in harmonics and of constant amplitude.

The output of multivibrator Q3, Q4 is connected by transistor follower to Q5 to transistor amplifier Q6 which has a tuned-collector circuit as indicated at 41. In like manner, the output of multivibrator Q11, Q12 is connected by transistor follower Q13 to transistor amplifier Q14 which has a tuned-collector circuit as indicated at 42.

The output of amplifier Q6 is connected to a second amplifier Q7 which also has a tuned-collector circuit 45.

Amplifier Q14 is similarly connected to a second amplifier stage Q15 having a tuned-collector circuit 47.

Amplifier Q6 and Q7 and amplifiers Q14 and Q15 are each operated in a saturated condition similarly to the Schmitt multivibrators Q3, Q4 and Q11, Q12 whereby upon actuation they go substantially instantaneously from a zero to a saturated signal level determined by the power supply voltage.

The collector circuit of each amplifier Q6 and Q14, in addition, is tuned to accept and pass only a preselected band of frequencies of the squared signal received from its associated multivibrator Q3, Q4, Q11, Q12, and amplifiers Q7 and Q15 are each similarly tuned to result in a signal output of an approximate sine wave over the pass band of the tuned-collector circuits whereby the amplitude of the signal output is substantially constant.

As merely one example, the frequency of the oscillator 20 may be selected to be 65 kilocycles and that of oscillator 25 as 75.886 kilocycles.

The amplifiers Q6, Q7 and Q14, Q15 may then be tuned to a center frequency of 455 kilocycles which amplifiers can then accept the 7th harmonic of the 65 kilocycle signal of oscillator 20 (65×7=455 kilocycles) and the 6th harmonic of the 75.886 kilocycle signal of oscillator 25 (75.886×6=45.316 kilocycles).

The center frequency of 455 kilocycles for the pass band of amplifiers Q6, Q7 and Q14, Q15 is preferred primarily because 455 kilocycles is a standard (IF) intermediate frequency whereby coil components are readily available. However, as will be appreciated by one skilled in the art, other oscillator frequencies and signal harmonics may be selected.

The components of the tuned amplifiers Q6, Q7 and Q14, Q15 are selected to accept a ±15 kilocycle pass band signal but operable to reject harmonic signal combinations such as, for example, the 6th and 8th harmonic combination for oscillator 20 and the 5th and 7th harmonic combination for oscillator 25 which might be present in the output signal waveform from the aforesaid multivibrators Q3, Q4 and Q11, Q12.

The signal output of the generator 10 is taken from the secondary of the adjustable coupling transformer in the tuned-collector circuit of amplifier Q7 and applied by conductor L1 to diode D1 as seen in FIG. 2.

The signal output of generator 11 is likewise taken from the secondary of the adjustable coupling transformer in the tuned-collector circuit of its amplifier Q15 and applied by jumper L2 and the aforesaid conductor L1 to the diode D1 wherein the said two signal outputs of generators 10 and 11 are mixed. The result is to produce an output signal from D1 having a frequency component representing the frequency sum of the output signal from generator 10 at a frequency of 455 kilocycles (the 7th harmonic of the aforesaid 650 kilocycle signal) and the output signal of generator 11 at a frequency of 455.316 kilocycles (the 6th harmonic of the aforesaid 75.886 kilocycle signal. This sum signal component has a frequency of 910.316 kilocycles.

Also produced is a signal frequency component representing the frequency difference between the output signals from generators 10 and 11.

As will be apparent, the frequency difference signal component has a frequency of 316 cycles, (455.316 kc.— 455.0 kc.=.316 kc. or 316 cycles).

The output signal from diode D1 is then applied to filter 15 which components thereof are selected to filter out the sum frequency signal component and to pass the difference frequency signal component. This difference signal component which in the present example is 316 cycles is then coupled through coupling capacitor C42 to two amplifiers Q21 and Q22 (16) connected in tandem and which are highly degenerative to provide excellent stability and constant gain in their output.

The output from amplifier Q22 is then connected by an emitter follower Q23 (17) to high pass band filter 18 comprising of C45 and L3 wherein is produced an A.C. signal output which is dependent only on the frequency of said beat frequency signal and the characteristics of the filter circuit.

This A.C. signal output from filter C45 and L3 is then applied to rectifier 19 comprising of diodes D2, D3 and capacitors C47, C48 and C49 which rectifies said signal output to provide a direct current signal at point Y, FIG. 2, whose value or magnitude is, in turn, related only to the aforesaid beat frequency signal and the characteristics of the filter L3 and C45.

This signal output may be defined as the "control signal or voltage" for the system.

The signal generator circuits 10 and 11 are so designed that equal changes in capacitance in the frequency determining networks of each oscillator 20, 25 produce equal frequency changes in the output signal (7th harmonic) of oscillator 20 and in the output signal (6th harmonic) of oscillator 25 whereby equal size object(s) approaching the probes 22, 22a at the same time produces substantially zero change in the beat frequency signal of 316 c.p.s. as an example such that the detection unit is quite insensitive to changes simultaneously affecting both probes 22, 22a.

The signal output of rectifier 19 following the filter circuit 18 is then coupled by a four stage cascaded emitter follower circuit Q24–A27 to a sensitivity control as shown as variable potentiometer P1 which is effective to reduce the loading on rectifier 19, improve stability and to provide a low impedance source to the amplifier Q28 connected to the output of follower Q27. Meter M1 connected between the potentiometer P1 and the system ground provides a visual indication of the sensitivity of the system.

The amplifier Q28, in turn, is connected to the input of a conventional transistor Schmitt multivibrator circuit Q29 and Q30, the output of said multivibrator connecting to transistor Q31 which drives the control or logic element such as depicted by the coil of relay 63. In the quiescent condition, the control signal is used to establish a norm or quiescent level for the control function.

A voltage divider comprising R94 and R95 and which is connected to the emitter electrode of transistor Q31 and also across the regulated DC supply −11 volts to ground. supplies about .6 volt to said emitter which in effect biases off Q31 by an amount to be safe at high operating temperatures where Q31 could conduct with perhaps 1 volt applied to its base. When Q31 is caused to conduct its emitter current then flows through R94 which if used alone would bias it back so it could not turn on, but diodes D4 and D13 connected in parallel with resistor R94 in the forward direction have a drop of about 1.2 volts so the majority of emitter current of Q31 is through the diodes D4 and D13. When Q31 conducts a rise in emitter voltage from .6 to 1.2 volts takes place and to eliminate the tendency of the relay to chatter at a critical setting of the sensitivity control P1 this rise of emitter voltage is coupled back to the Schmitt multivibrator Q29, Q30 by way of resistor R63 to boost the turn on voltage of the Schmitt multivibrator Q29, Q30. Conversely, when the relay is caused to open by the signal output of Q28 being below the firing point of the Schmitt multivibrator Q29, Q30 the emitter voltage of Q31 drops to .6 volt. This change is again coupled back to Q29 through resistor R63 to drop the multivibrator control voltage .6 volt below the firing point. This "boostrap" action aids in producing a differential that might otherwise be objectional and provides a positive on-off relay action.

The detection system as thus far described is extremely sensitive in detecting the approach of an object(s) or material to the sensor probe input.

Usually only probe 22 in circuit with generator 10 is used as the sensor element for the system and probe 22a is disconnected from its generator 11.

In this instance, the oscillator Q25 of generator 11 is tuned by means of variable capacitors C28, C29 to provide the output signal from generator 11. The values of capacitors C28, C29 in this instance would include the cable and probe capacity of probe 22a.

With the system as thus described and the sensor probe 22 positioned to detect the approach of an object(s) or material as for example the passage and counting of spaced objects carried on a conveyor or the like, each time an object approaches the probe 22 and is detected thereby, the frequency determining network of signal generator 10 is changed which in turn causes the frequency of the output signal of said generator to change or increase.

This change (increase) in frequency results in the generation, as in the manner previously described, of an "active beat frequency signal" which, in turn, provides a "control signal" whose magnitude represents the detection of said object. This control signal is then used to operate the relay 60 or logic computer element.

As the object moves away from probe 22, the frequency of the signal of generator 10 returns to its quiescent state and the relay is once again de-energized to await the detection of the next object.

In the event an object(s) is moved into proximity to the probe unit 22 and remains for a relatively short period of time before being carried and/or moved away, but for a period longer than the object(s) the system is presently detecting remains in proximity to the probe, the instant system includes circuit means whereby the presence of this transient object(s) affects the quiescent condition or balance of the system whereby the detection of the object(s) is interrupted.

Likewise, in the event an object(s) is moved into proximity of the probe 22 and remains there for a relatively long period of time, or if the probe 22 is relocated to effect the frequency determining network of the signal generator 10 means is provided to return the system to its quiescent balance and to effectively ignore this change in location and/or static disposition of said object.

To accomplish this a relatively large capacitor C51 as seen in FIG. 2 is connected between the base of transistor follower Q25 and the system ground. A voltage is developed at the emitter of transmitter follower Q26, FIG. 3, which is a function of that voltage at the emitter of follower Q24 but with a time delay as, for example, several seconds or longer to require said developed voltage to reach a steady state sufficiently to actuate the relay 60. The added capacitance of C51 is in effect multiplied by the current gain of follower Q25. This delayed voltage is then applied by conductor 50 to the base of transistor Q8 to cause its bias to vary in accordance with the voltage of the rectifier 19 following the filter 18 to cause transistor Q8 to change its conductance (or resistance) accordingly and to cause capacitor C13 across the collector-emitter of transistor Q8 to be more or less effective to change the frequency of generator 11 accordingly and bring the system back to its quiescent balance. Transistor Q8 therefore acts as a reactance modulator to vary the frequency of the oscillator 25. This compensating system is ideal for object(s) that are only in the presence of the probe for short periods of time; however, if said object(s) is left there for a relatively long period the system will establish a new quiescent balance and release any relay closure that might have been made. In this instance the object detected has to be removed before the system can return to its original condition of balance.

Another embodiment of circuitry for preventing improper or false detection of an object(s) or event is shown in FIG. 4. In this instance the DC output of the rectifier 19 following the filter 18 is taken from the emitter electrode of follower Q27 and applied by conductor 52 to the input terminal of a differential amplifier 61. The input of this amplifier is seen to include a pair of diodes D14, D15 connected in series circuit across a regulated power source of —11 volts DC. Each diode is connected to a base electrode of transistor Q32, Q33 respectively, each being connected in a balanced follower configuration. The emitter electrodes of said followers Q32, Q33 are connected together and to the input electrode (base) of a differential amplifier stage comprising of transistors Q34, Q35.

The output of amplifier Q34 is taken from its collector and applied to the base input of a follower Q36 of PNP configuration and also to the base input of follower Q39 which is of NPN configuration.

The output of follower Q36 is connected to one end of a relay coil 81 and the output of follower Q39 is connected to one end of relay coil 82. As shown in FIG. 4 follows Q36 and Q39 are connected in parallel with each other or in a "back-to-back" arrangement as oftentimes referred to in the art.

The second input to the differential amplifier stage 61 is taken from the junction of the divider network R108 and R109 connected across the aforesaid DC voltage source and applied to the base electrode of amplifier Q35.

The amplified output of amplifier Q35 is taken from its collector electrode and applied to followers Q37 and Q38 of NPN and PNP configuration respectively, and which are likewise connected in back-to-back relation.

The output of follower Q37 is taken from its emitter to the opposite end of relay coil 81 whereas the emitter output of follower Q38 is connected to the opposite end of relay coil 82.

With the system at balance and performing its regular detecting function, the output of amplifier Q34 is equal to the output of amplifier Q35 and consequently neither relay coil 81 or 82 is energized.

The divider network R108 and R109 is so proportioned with respect to the other circuit components as are hereinafter listed to operate the differential amplifier 61 at a midpoint of its operating range.

The relay coil 81 has a normally-open contact 89 associated therewith, and in like manner relay coil 82 has a normally-open contact 91.

Contact 89 is seen to be connected in circuit with the REV coil of a suitable electric motor M whereby closing said contact causes the motor to run in one direction, say reverse or clockwise. Contact 91 associated with relay coil 82 is likewise connected with said motor coil circuit so that when said contact is closed the motor is energized in the forward or counterclockwise direction.

At balanced condition of the system neither relay coil 81, 82 is energized and their respective contacts 89 and 91 are open.

The shaft of the motor M is connected to the adjustable arm 93 of a suitable variable potentiometer P2 connected in turn across a suitable source of energy as, for example, —11 volts DC.

The adjustable arm of potentiometer P2 is connected by conductor 62 to the base electrode of reactance modulator Q8, FIG. 3 to provide a bias component to the latter.

When an object is moved into proximity of probe 22 and remains there it is effective to cause the frequency of the signal output of generator 10 to increase. The control voltage rises as a result of the increase in the beat frequency signal and is retained, and this increased control voltage is applied by conductor 52 to the differential amplifier 61, FIG. 4 which upsets the initial quiescent balance of said amplifier. As a result, a signal is generated by amplifier 61 corresponding to this unbalance which is effective to operate one of the relays 81, 82 and energize the motor M in a direction to change the bias of modulator Q8. This bias change causes the frequency of output signal of generator 11 to likewise correspondingly rise effective to return the system to the initial quiescent balance condition when the initial beat frequency signal is again obtained.

Two probe operation of the detection system may be desirable as, for example, sensing the approach of an object(s) or material toward either of two detection stations.

For this purpose, as seen in FIGS. 1 and 3, a second probe 22a may be connected into the input of the signal generator 11, and the generators 10 and 11 then tuned to provide a quiescent beat frequency signal in the same manner aforementioned.

The approach of an object(s) or material toward probe 22 operates the detection system in the manner previously described to provide an "active beat frequency signal" which has a magnitude corresponding to the increase in the frequency of the signal output of generator 10.

The approach of an object(s) or material toward probe 22a, on the other hand, causes the frequency determining components (series resonant circuit) of generator 11 to change such that the frequency of the output signal of said generator 11 increases correspondingly.

The signal output of increased or higher frequency, when mixed at diode D1 with the output of generator 10, produces an "active beat frequency signal" of less magnitude than that of the quiescent beat frequency signal.

This decreased signal level when applied to the base electrode of transistor follower Q24, and the cascaded followers Q25, Q26 and Q27 and then to the amplifiers Q28–Q31, drives the amplifiers Q28–Q31 toward non-conduction whereby the relay 60 is not operated.

Figure 5:
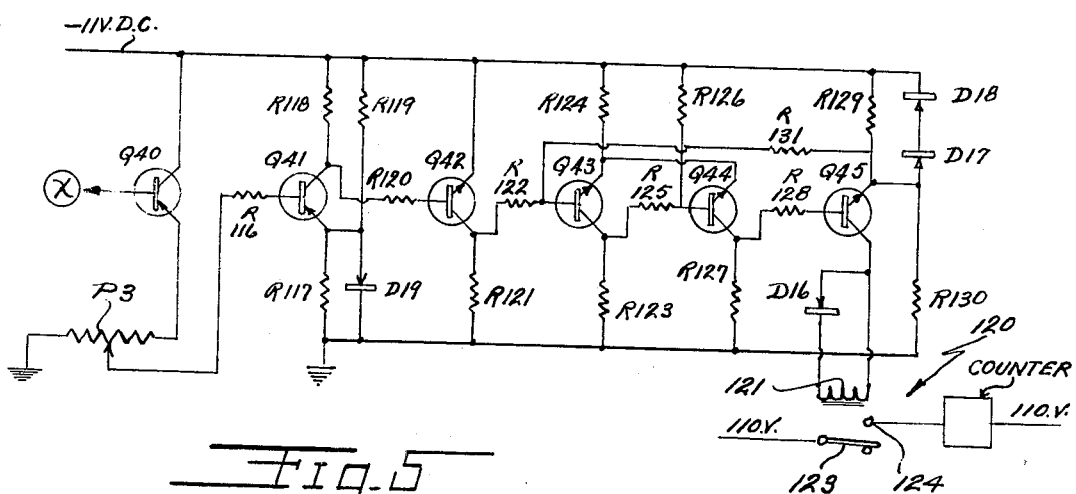

To accommodate this decreased signal level a second relay driver circuit, as shown in its entirety in FIG. 5, is adapted to be connected at its input (X) to the emitter electrode of the follower Q24, FIG. 2.

The relay driver circuit of FIG. 5 is seen to include input follower Q40 which has as its output an adjustable emitter bias potentiometer P3 connected to the base input of PNP amplifier Q41.

The collector electrode output of amplifier Q41, in turn, is connected to the base of NPN transistor amplifier Q42 which functions in the circuit shown as an inverter.

The output of inverter amplifier Q42 is connected to the input of Schmitt multivibrator Q43, Q44, the output of the latter connecting to the input of relay driver amplifier Q45.

Relay coil 121 of relay 120 is connected into the emitter circuit of amplifier Q45. The relay 120 is provided with a normally-open movable contact 123 which may be connected to a suitable source of electrical energy such as 110 volts AC. The corresponding fixed contact 124 of said relay 120 may be connected to a suitable indicator such as a counter, the latter in turn being connected into the said source of electrical energy as shown.

With this circuit, as an object(s) or material approaches the probe 22a so as to produce an "active beat frequency signal" of a corresponding decreased signal magnitude, this decrease in signal magnitude is applied through follower Q40 to the base of amplifier Q41 whereby said amplifier becomes correspondingly nonconductive. As a result, the voltage level on the base of inverter Q42 goes more positive, whereas, since it is of NPN configuration, its signal output increases.

This increased signal output is applied to the Schmitt multivibrator Q43, Q44 which is then operable in the same manner as multivibrator Q29, Q30 to provide a signal output to amplifier Q45 which then generates a "control signal" representative of the decrease in said beat frequency signal.

The output of amplifier Q45 is applied to the coil 121 of relay 120 effective to energize the same and move contact 123 to its closed position.

As a result, the counter device is energized to provide a digital or logic output signifying that an object(s) or material has approached the probe device 22a.

The following list of components as are identified by reference characters found in the drawings have been used in the manufacture of a satisfactory operative system as above described.

RESISTORS

| | | |
|---|---|---|
| R-1 ........ 47K | R-40 .... 22K | R-88 .... 4.7K |
| R-2 ........ 22K | R-41 .... 10K | R-89 .... 4.7K |
| R-3 ........ 1K | R-42 .... 47K | R-90 .... 270 ohm |
| R-4 ........ 2.2K | R-43 .... 47K | R-91 .... 10K |
| R-5 ........ 22K | R-44 .... 2.2K | R-92 .... 3.3K |
| R-6 ........ 22K | R-45 .... 47K | R-93 .... 1K |
| R-7 ........ 4.7K | R-46 .... 470 ohm | R-94 .... 270 ohm |
| R-8 ........ 4.7K | R-47 .... 100 ohm | R-95 .... 4.7K |
| R-9 ........ 10K | R-48 .... 47K | R-96 .... 4.7K |
| R-10 ....... 270 ohm | R-49 .... 470 ohm | R-97 .... 470 ohm |
| R-11 ....... 10K | R-50 .... 270 ohm | R-98 .... 470 ohm |
| R-12 ....... 22K | R-51 .... 100 ohm | R-100 ... 100K |
| R-13 ....... 10K | R-52 .... 470 ohm | R-101 ... 100K |
| R-14 ....... 47K | R-54 .... 100 ohm | R-102 ... 1K |
| R-15 ....... 47K | R-61 .... 10K | R-103 ... 1K |
| R-16 ....... 2.2K | R-62 .... 1K | R-104 ... 4.7K |
| R-17 ....... 47K | R-63 .... 22K | R-105 ... 4.7K |
| R-18 ....... 470 ohm | R-64 .... 100K | R-106 ... 270 ohm |
| R-19 ....... 100 ohm | R-65 .... 100K | R-107 ... 4.7K |
| R-20 ....... 47K | R-66 .... 4.7K | R-108 ... 8.2K |
| R-21 ....... 470 ohm | R-67 .... 1K | R-109 ... 680 ohm |
| R-22 ....... 270 ohm | R-68 .... 47K | R-110 ... 15K |
| R-23 ....... 100 ohm | R-69 .... 270 ohm | R-116 ... 1K |
| R-24 ....... 470 ohm | R-70 .... 22K | R-117 ... 22K |
| R-26 ....... 2.2K | R-71 .... 100K | R-118 ... 4.7K |
| R-27 ....... 22K | R-72 .... 47K | R-119 ... 2.2K |
| R-28 ....... 270 ohm | R-73 .... 2.2K | R.120 ... 1K |
| R-29 ....... 47K | R-77 .... 100K | R.121 ... 4.7K |
| R-30 ....... 22K | R-78 .... 22K | R-122 ... 100 ohm |
| R-31 ....... 2.2K | R-79 .... 220K | R-123 ... 4.7K |
| R-32 ....... 1K | R-80 .... 100K | R-124 ... 100 ohm |
| R-33 ....... 22K | R-81 .... 10K | R.125 ... 4.7K |
| R-34 ....... 22K | R-82 .... 470 ohm | R.126 ... 10K |
| R-35 ....... 4.7K | R-83 .... 1.5K | R-127 ... 4.7K |
| R-36 ....... 4.7K | R-84 .... 22K | R-128 ... 1K |
| R-37 ....... 10K | R-85 .... 4.7K | R-129 ... 270 ohm |
| R-38 ....... 270 ohm | R-86 .... 4.7K | R-130 ... 4.7K |
| R-39 ....... 10K | R-87 .... 1K | R-131 ... 22K |

POTENTIOMETERS    TRANSFORMERS

| | |
|---|---|
| P-1 ............ 0-100K | T-1 ............ 455 kc. |
| P-2 ............ 0-100K | T-2 ............ 455 kc. |
| P-3 ............ 0-100K | T-3 ............ 455 kc. |
| | T-4 ............ 455 kc. |

CAPACITORS

| | | |
|---|---|---|
| C-1 ....... .047 mfd. | C-15 .. .1 mfd. | C-33 .. 10 mfd. |
| C-2 ....... .1 mfd. | C-16 .. 10 mfd. | C-34 .. .1 mfd. |
| C-3 ....... 10 mfd. | C-17 .. .0047 mfd. | C-35 .. .01 mfd. |
| C-4 ....... .1 mfd. | C-18 .. .1 mfd. | C-40 .. .001 mfd. |
| C-5 ....... .0047 mfd. | C-20 .. .01 mfd. | C-41 .. .0047 mfd. |
| C-6 ....... 10 mfd. | C-21 .. 400 mmf. | C-42 .. .0047 mfd. |
| C-7 ....... .01 mfd. | C-22 .. 100 mmf. | C-43 .. 1.5 mfd. |
| C-8 ....... 400 mmf. | C-23 .. 1,000 mmf. | C-44 .. .0047 mfd. |
| C-9 ....... 100 mmf. | C-24 .. .01 mfd. | C-45 .. .22 mfd. |
| C-10 ...... 1,000 mmf. | C-28 .. .047 mfd. | C-46 .. 25 mfd. |
| C-11 ...... .01 mfd. | C-29 .. .1 mfd. | C-47 .. 1.5 mfd. |
| C-12 ...... .47 mfd. | C-30 .. .0047 mfd. | C-48 .. 1.5 mfd. |
| C-13 ...... 47 mmf. | C-31 .. 10 mfd. | C-49 .. 1.5 mfd. |
| C-14 ...... .047 mfd. | C-32 .. .01 mfd. | C-51 .. 7 mfd. |

TRANSISTORS

| | | | | | |
|---|---|---|---|---|---|
| Q-1 ...... | 2N1303 | Q-15 .... | 2N1303 | Q-33 .... | 2N1302 |
| Q-2 ...... | 2N1303 | Q-21 .... | 2N1303 | Q-34 .... | 2N1303 |
| Q-3 ...... | 2N1303 | Q-22 .... | 2N1303 | Q-35 .... | 2N1303 |
| Q-4 ...... | 2N1303 | Q-23 .... | 2N1303 | Q-36 .... | 40319 |
| Q-5 ...... | 2N1303 | Q-24 .... | 2N1303 | Q-37 .... | 2N3053 |
| Q-6 ...... | 2N1303 | Q-25 .... | 2N1303 | Q-38 .... | 40319 |
| Q-7 ...... | 2N1303 | Q-26 .... | 2N1303 | Q-39 .... | 2N3053 |
| Q-8 ...... | 2N1303 | Q-27 .... | 2N1303 | Q-40 .... | 2N1303 |
| Q-9 ...... | 2N1303 | Q-28 .... | 2N1303 | Q-41 .... | 2N1303 |
| Q-10 ..... | 2N1303 | Q-29 .... | 2N1303 | Q-42 .... | 2N1302 |
| Q-11 ..... | 2N1303 | Q-30 .... | 2N1302 | Q-43 .... | 2N1302 |
| Q-12 ..... | 2N1303 | Q-31 .... | 2N3053 | Q-44 .... | 2N1302 |
| Q-13 ..... | 2N1303 | Q-32 .... | 2N1303 | Q-45 .... | 2N3053 |
| Q-14 ..... | 2N1303 | | | | |

DIODES

| | | | | | |
|---|---|---|---|---|---|
| D-1 ...... | IN34A | D-12 .... | IN746A | D-16 .... | IN3755 |
| C-2 ...... | IN34A | D-13 .... | IN3755 | D-17 .... | IN3755 |
| D-3 ...... | IN34A | D-14 .... | IN625 | D-18 .... | IN3755 |
| D-4 ...... | IN3755 | D-15 .... | IN625 | D-19 .... | IN746A |
| D-5 ...... | IN3755 | | | | |

Having thus described the detection system of the present invention it will be realized that various modifications may be made thereto without departing from the inventive concepts as are defined in the claims.

What is claimed is:

1. A detection system comprising a pair of signal generators each operating to provide an alternating current signal of a predetemrined frequency bearing a selected frequency relationship to each other, amplifier means connected to each of said generators and operable to amplify the alternating current signal to a saturated level, filter means in the output of each of said amplifier means and cooperating therewith to provide an output signal having a constant amplitude and a predetermined frequency band, means connected to each amplifier means for mixing the output signals therefrom and to provide a beat frequency signal of constant amplitude representing a balance condition, sensor means in series circuit with at least one of said signal generators effective upon sensing the presence of an object to cause the said one generator to change its frequency of operation and to provide a corresponding change in frequency in its signal output, resulting in a change in the frequency of the beat frequency signal, band pass filter means in circuit with said mixing means for producing an alternating current output signal from said beat frequency signal, and rectifier means in circuit with said filter means for rectifying said alternating current signal and to provide a control signal whose value is solely responsive to the frequency of said alternating signal.

2. A detection system as is defined in claim 1 and which includes reactance modulator means connected to one of said signal generators, and time delay means connected between the rectifier means and said modulator means effective to change the frequency of said one generator and to provide a quiescent balance condition.

References Cited

UNITED STATES PATENTS

| | | | |
|---|---|---|---|
| 1,661,058 | 2/1928 | Theremin | 331—37 X |
| 2,112,826 | 4/1938 | Cook | 340—258 |
| 3,230,518 | 1/1966 | Vassil et al. | 340—258 |
| 1,867,567 | 7/1932 | Hansell | 331—40 X |
| 2,421,771 | 6/1947 | Browning | 331—40 X |

JOHN W. CALDWELL, Primary Examiner

D. L. TRAFTON, Assistant Examiner

U.S. Cl. X.R.

317—146, 147; 331—37, 40, 65; 340—258